US008423253B2

(12) United States Patent
Mori et al.

(10) Patent No.: US 8,423,253 B2
(45) Date of Patent: Apr. 16, 2013

(54) AUTOMATIC BRAKING APPARATUS FOR A VEHICLE

(75) Inventors: Yukio Mori, Kariya (JP); Koicho Kokubo, Nagoya (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 1270 days.

(21) Appl. No.: 11/525,095

(22) Filed: Sep. 22, 2006

(65) Prior Publication Data

US 2007/0100530 A1 May 3, 2007

(30) Foreign Application Priority Data

Oct. 28, 2005 (JP) ................................. 2005-314176

(51) Int. Cl.
B60T 7/12 (2006.01)
(52) U.S. Cl.
USPC ............. 701/70; 303/121; 303/125; 303/138; 303/139; 303/152; 303/154; 303/158; 303/160; 303/177; 303/112; 303/28; 180/170; 701/36; 701/51; 701/53; 701/61; 701/65; 701/66; 701/69; 701/78; 701/79; 701/82; 701/83; 701/84; 701/99; 701/101; 701/102
(58) Field of Classification Search .................. 701/1, 2, 701/19, 20, 22, 29, 36, 48, 50–66, 69–98; 303/121–140
See application file for complete search history.

(56) References Cited

U.S. PATENT DOCUMENTS

| | | | | |
|---|---|---|---|---|
| 4,961,146 A | * | 10/1990 | Kajiwara | 701/93 |
| 4,969,103 A | * | 11/1990 | Maekawa | 701/96 |
| 5,234,071 A | * | 8/1993 | Kajiwara | 180/169 |
| 6,339,740 B1 | * | 1/2002 | Seto et al. | 701/96 |
| 6,928,355 B2 | * | 8/2005 | Nihei et al. | 701/71 |
| 7,317,978 B2 | * | 1/2008 | Ashizawa et al. | 701/54 |
| 7,739,021 B2 | * | 6/2010 | Wegeng et al. | 701/70 |
| 8,027,774 B2 | * | 9/2011 | Laiou et al. | 701/70 |
| 2001/0029419 A1 | * | 10/2001 | Matsumoto et al. | 701/80 |
| 2002/0107629 A1 | * | 8/2002 | Maruko et al. | 701/93 |
| 2002/0134602 A1 | * | 9/2002 | Kobayashi et al. | 180/169 |

(Continued)

FOREIGN PATENT DOCUMENTS

| | | |
|---|---|---|
| JP | 10-181389 A | 7/1998 |
| JP | 11-268558 A | 10/1999 |

OTHER PUBLICATIONS

Official Action dated Feb. 22, 2011, issued in corresponding Japanese Patent Application No. 2005-314176, and English language translation of the Official Action.

Primary Examiner — Jonathan M Dager
(74) Attorney, Agent, or Firm — Buchanan Ingersoll & Rooney PC (57) ABSTRACT

A torque applying device is provided for applying a driving torque to at least a pair of wheels, and a torque restraining device is provided for restraining the torque created on the wheels to be applied with the torque by the torque applying device. A friction braking device is provided for applying a braking torque to each wheel in response to operation of a brake pedal. An automatic braking control device automatically actuates the friction braking device independently of operation of the brake pedal, to apply the braking torque to each wheel. And, a torque restraining cancellation device is provided for cancelling the torque restraining operation for a time period determined in response to a vehicle speed decreasing state, after a condition for initiating the automatic braking control was fulfilled.

11 Claims, 6 Drawing Sheets

U.S. PATENT DOCUMENTS

| | | | |
|---|---|---|---|
| 2004/0215385 A1* | 10/2004 | Aizawa et al. | 701/93 |
| 2004/0250792 A1* | 12/2004 | Mizobuchi et al. | 123/322 |
| 2005/0040700 A1* | 2/2005 | Yokoyama et al. | 303/20 |
| 2005/0107939 A1* | 5/2005 | Sadano et al. | 701/70 |
| 2005/0124458 A1* | 6/2005 | Iwatsuki et al. | 477/34 |
| 2006/0064225 A1* | 3/2006 | Tabata et al. | 701/96 |
| 2006/0066146 A1* | 3/2006 | Otomo | 303/151 |
| 2006/0095192 A1* | 5/2006 | Uhler et al. | 701/96 |

* cited by examiner

AUTOMATIC BRAKING APPARATUS FOR A VEHICLE

This application claims priority under 35 U.S.C. Sec. 119 to No. 2005-314176 filed in Japan on Oct. 28, 2005, the entire content of which is herein incorporated by reference.

BACKGROUND

The present invention relates to an automatic braking apparatus provided with an automatic braking control device for automatically actuating a friction braking device independently of a manually operated braking member, to apply a braking torque to each wheel, and particularly relates to the apparatus for performing the automatic braking control by the friction brake, when a restraining torque is being applied to the wheel with an engine brake, for example.

Recent vehicles are required to perform an automatic braking control, which is adapted to measure a distance from a vehicle to another vehicle ahead thereof or a difference between vehicle speeds of them, and adapted to perform a braking operation automatically to reduce the vehicle speed, if it is required to reduce the vehicle speed, and unless the vehicle driver is accelerating the vehicle, and which may be called as an adaptive cruise control (abbreviated as ACC). Now, control apparatuses for enabling the automatic braking control are getting popular.

For example, in Japanese Patent Laid-open Publication No. 11-268558, there is disclosed as a prior art, a braking and driving force control apparatus for measuring a distance between a vehicle and another vehicle ahead thereof, and controlling a vehicle speed, or braking and driving force, so as to maintain the distance to be of an appropriate value. Then, in order to improve a ride comfort of the vehicle and realize the braking and driving force control with a good responsibility in overall vehicle speed range, proposed is the braking and driving force control apparatus for controlling axle torque of driving wheels of a traveling control apparatus provided for controlling a distance between the vehicles, or controlling the braking and driving force. With respect to this apparatus, it is described that an engine torque command value is calculated in accordance with a braking and driving force command value, and a throttle opening command value for a throttle actuator is calculated on the basis of the engine torque command value and the number of rotations of the engine. Next, a lower limit value for the throttle opening command value is calculated to be variable in accordance with the vehicle traveling state, and the throttle opening is limited in accordance with the lower limit value. Next, based on the lower limit value for the throttle opening command value and the number of rotations of the engine, the engine torque is calculated, and modified value of the braking and driving force is calculated in accordance with the lower limit value of engine torque. Then, as it is so constituted that the command value of the braking and driving force and the modified value of the braking and driving force are input, to calculate amount of operation of a brake actuator, it is described that the lower limit of the throttle opening can be set in accordance with the vehicle traveling state.

According to the braking and driving force control apparatus as described in the Publication, it is aimed to obtain a desired deceleration, with the engine brake and friction brake being controlled coordinately. In this case, if the engine torque is varied, for example, a delay will be caused to reflect it to vehicle deceleration. However, it is difficult to compensate the delay with the friction brake. As for the torque to be transmitted from the power train including the engine to the wheels (driving wheels), there are a driving torque provided by the power train, and a torque provided by the engine brake or the like for acting in a restraining direction opposite to the driving direction, which is negative driving torque, and called hereinafter as restraining torque. However, it is difficult to estimate accurately the restraining torque. Therefore, it is very difficult to control the braking torque, which is provided for reducing the torque created on the wheel by the friction brake and the restraining torque as described above, coordinately. Yet, it is extremely difficult to do so only by the friction brake.

With respect to the torque applied to the wheels (driving wheels), the restraining torque corresponds to the torque provided in the direction for preventing the wheels from being rotated, as well as the braking torque. Therefore, both of the restraining torque and the braking torque result in the braking force. In this application, however, they are distinguished from each other, so as to identify their origins.

SUMMARY

Accordingly, it is an object of the present invention to provide an automatic braking apparatus for a vehicle, which is capable of obtaining a smooth brake feeling, even if an automatic braking control by a friction brake is performed, when a restraining torque is being applied to a wheel, with an engine brake, for example.

In accomplishing the above and other objects, the automatic braking apparatus comprises a torque applying device for applying a driving torque to at least a pair of wheels of the vehicle, a torque restraining device for restraining the torque created on the wheels to be applied with the torque by the torque applying device, a friction braking device for applying a braking torque to each wheel of the vehicle in response to operation of a manually operated braking member by a vehicle driver, and an automatic braking control device for performing an automatic braking control, by automatically actuating the friction braking device independently of operation of the manually operated braking member, to apply the braking torque to each wheel. And, the torque restraining cancellation device is provided for cancelling the torque restraining operation performed by the torque restraining device, for a time period determined in response to a vehicle speed decreasing state of the vehicle, after a condition for initiating the automatic braking control performed by the automatic braking control device was fulfilled.

Preferably, the apparatus as described above may further comprise a deceleration detection device for detecting a deceleration of the vehicle, and the torque restraining cancellation device is adapted to cancel the torque restraining operation performed by the torque restraining device, when the deceleration detected by the deceleration detection device exceeds a predetermined reference deceleration.

Or, the apparatus may further comprise a vehicle traveling state determination device for determining a vehicle traveling state including an inclination of road surface on which the vehicle is traveling, and the torque restraining cancellation device is adapted to cancel the torque restraining operation performed by the torque restraining device, in response to a variation of the inclination of road surface determined by the vehicle traveling state determination device.

Then, the apparatus may further comprise a deceleration detection device for detecting a deceleration of the vehicle, and a desired deceleration may be provided for a control target to the deceleration detected by the deceleration detection device, and the time period may be set in response to a variation of the desired deceleration.

Preferably, the time period may be set in response to a variation of the torque restrained by the torque restraining device.

Or, the apparatus may further comprise a radar device for detecting a state in front of the vehicle, and the automatic braking control device may apply the braking torque to each wheel, in response to the state detected by the radar device.

Furthermore, the torque applying device may include an engine for constituting a power train installed in the vehicle, and wherein the torque restraining device restrains the torque created on the wheels to be applied with the torque by the torque applying device, with an engine brake provided by the engine.

BRIEF DESCRIPTION OF THE DRAWINGS

The above stated object and following description will become readily apparent with reference to the accompanying drawings, wherein like referenced numerals denote like elements, and in which.

DETAILED DESCRIPTION OF EMBODIMENT

Figure 1:
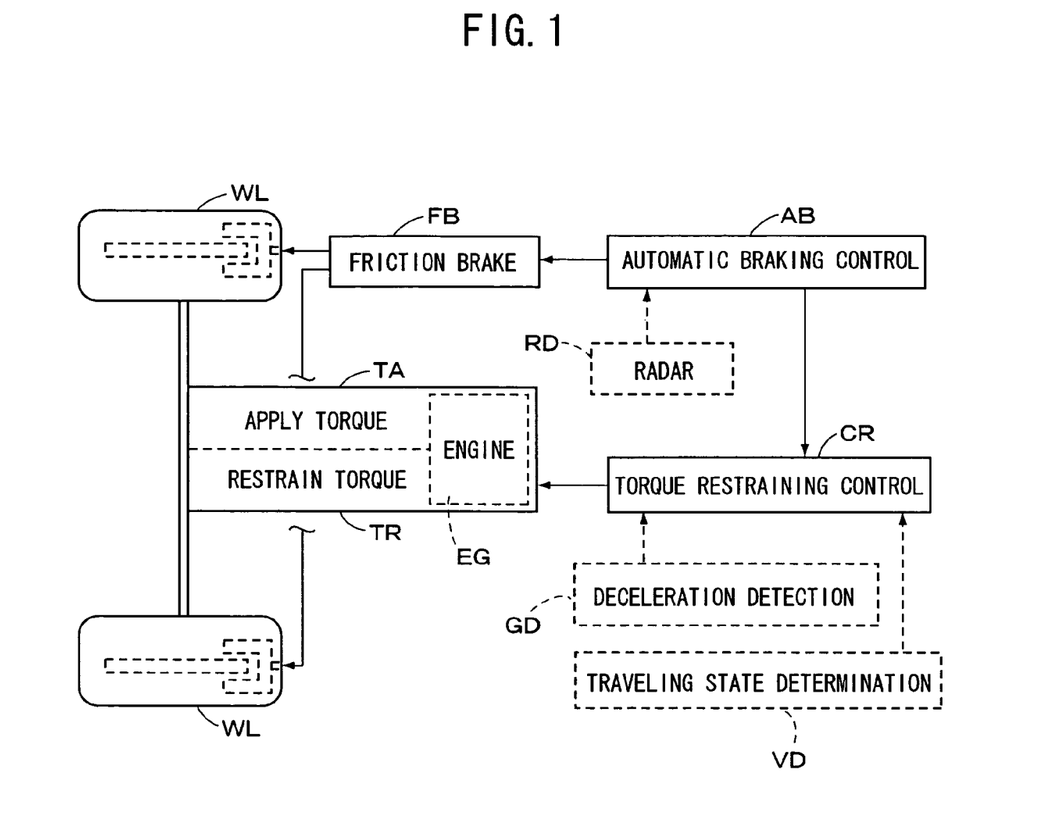
FIG. 1 is a schematic block diagram of an automatic braking apparatus according to an embodiment of the present invention.
Figure 2:
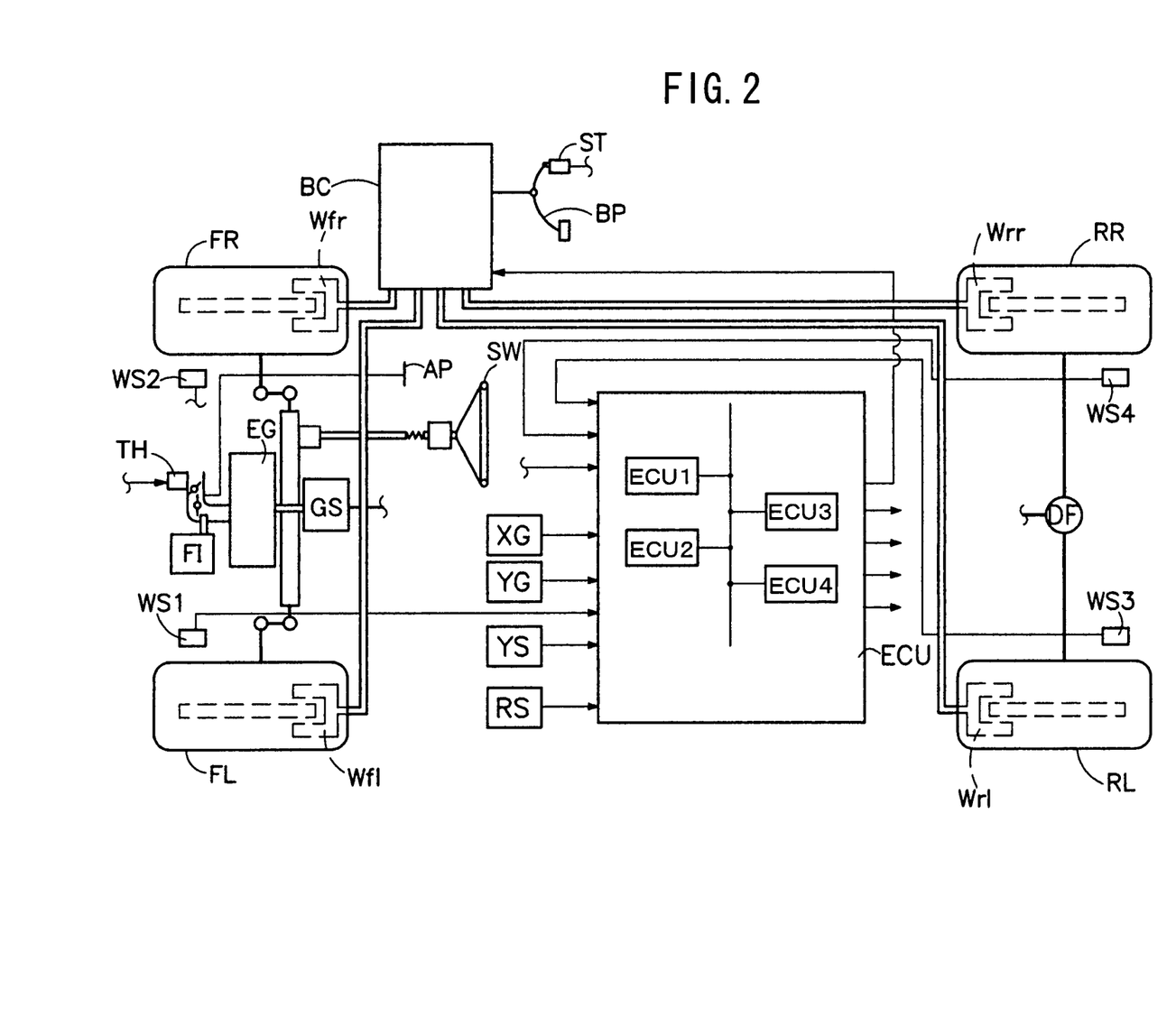
FIG. 2 is a schematic block diagram of a vehicle having an automatic braking apparatus according to an embodiment of the present invention.

Referring to FIG. 1, there is schematically illustrated an automatic braking apparatus for a vehicle, according to an embodiment of the present invention. According to the present embodiment, the apparatus is provided with a torque applying device TA for applying a driving torque to at least a pair of wheels WL, WL of the vehicle, a torque restraining device TR for restraining the torque created on the wheels WL, WL to be applied with the torque by the torque applying device TA, a friction braking device FB for applying a braking torque to each wheel WL in response to operation of a manually operated braking member, which includes a brake pedal BP as shown in FIG. 2, and an automatic braking control device AB for performing an automatic braking control, by automatically actuating the friction braking device FB independently of the manually operated braking member, to apply the braking torque to each wheel WL. And, a torque restraining cancellation device CR is provided for cancelling the torque restraining operation performed by the torque restraining device TR, for a time period determined in response to a vehicle speed decreasing state of the vehicle, after a condition for initiating the automatic braking control performed by the automatic braking control device AB was fulfilled.

Furthermore, as indicated by a broken line in FIG. 1, a deceleration detection device GD may be provided for detecting a deceleration of the vehicle, and it may be so constituted that the torque restraining cancellation device CR cancels the torque restraining operation performed by the torque restraining device, when the deceleration detected by the deceleration detection device GD exceeds a predetermined reference deceleration. In the case where the apparatus is equipped with a radar device RD for detecting a state in front of the vehicle, to perform the adaptive cruise control, for example, it is so constituted that the automatic braking control device AB is adapted to apply the braking torque to each wheel, in response to the state detected by the radar device RD. The torque applying device TA includes an engine which constitutes a power train (not shown) installed in the vehicle. In this case, the torque restraining device TR is adapted to restrain the torque created on the wheels WL, WL to be applied with the torque, according to an engine brake provided by the engine. As for the torque restraining device TR, a so-called retarder may be used. In the present embodiment, the driving torque and braking torque applied to each wheel of a pair of wheels WL, WL is to be controlled, whereas the torque applied to an axle for connecting those wheels WL, WL may be controlled, to represent both of the wheels. The latter feature is included in the present invention, as a matter of course.

Referring to FIG. 2, there is schematically illustrated an overall structure of a vehicle with the automatic braking apparatus according to an embodiment of the present invention. First of all, a power train system of the present embodiment includes an engine EG provided with a fuel injection apparatus FI and a throttle control apparatus TH which is adapted to control a throttle opening in response to operation of an accelerator pedal AP. Also, the throttle opening of the throttle control apparatus TH is controlled and the fuel injection apparatus FI is actuated to control the fuel injected into the engine EG, in response to output of the electronic control unit ECU. According to the present embodiment, the engine EG is operatively connected with the rear wheels RL and RR through a transmission GS and a differential gear apparatus DF. Thus, a so-called rear drive system is constituted in FIG. 2, while the drive system is not limited to the rear drive system, but the present invention is applicable to a front drive system or a four-wheel drive system.

Next, in a brake system of the present embodiment, wheels FL, FR, RL and RR are operatively associated with wheel brake cylinders Wfl, Wfr, Wrl and Wrr, respectively, to which a hydraulic brake control apparatus BC is connected. In FIG. 2, a wheel FL designates the wheel at the front left side as viewed from the position of a driver's seat, a wheel FR designates the wheel at the front right side, a wheel RL designates the wheel at the rear left side, and a wheel RR designates the wheel at the rear right side. The hydraulic brake control apparatus BC includes a plurality of electromagnetic valves and an automatic hydraulic pressure source such as a hydraulic pressure pump, to provide a hydraulic pressure circuit capable of pressurizing brake fluid automatically. The apparatus BC is the same as a conventional apparatus in the prior art, as will be described later with reference to FIG. 7. With respect to the steering system, an electric power steering system (EPS) is used in the present embodiment, which does not relate directly to the present invention, and therefore explanation of which is omitted herein.

As shown in FIG. 2, in the vicinity of the wheels FL, FR, RL and RR, there are provided wheel speed sensors WS1-WS4, respectively, which are connected to the electronic control unit ECU, and by which a signal having pulses proportional to a rotational speed of each wheel, i.e., a wheel speed signal is fed to the electronic control unit ECU. There are also provided a stop switch ST which turns on when the brake pedal BP is depressed, a longitudinal acceleration sensor XG for detecting a vehicle longitudinal acceleration Gx (hereinafter, the longitudinal deceleration is indicated by "Gb"), which serves as the aforementioned deceleration detection device GD, a lateral acceleration sensor YG for detecting a vehicle lateral acceleration Gy, a yaw rate sensor YS for detecting a yaw rate γ of the vehicle and the like. These are electrically connected to the electronic control unit ECU. On the basis of those detected signals, the vehicle traveling state including variation of inclination of the vehicle traveling road surface can be determined, according to the electronic control unit ECU. For example, variation of gradient of the vehicle traveling road surface inclination can be determined, on the basis of comparison between the deviation of the wheel speed detected by the wheel speed sensors WS1-WS4 and the output of the longitudinal acceleration sensor XG. With the aforementioned sensors and electronic control unit ECU, therefore, can be constituted the vehicle traveling state determination device VD for determining various vehicle traveling states. Furthermore, according to the present embodiment, a radar sensor RS is connected to the electronic control unit ECU, to be served as the radar device RD, and various devices including a laser radar and a millimeter wave radar (not shown) have been on the market.

In the electronic control unit ECU, the engine control system, braking control system, adaptive cruise control system and steering control system are connected with each other through a communication bus, so that each system may hold each information commonly. Among them, the engine control system includes a engine control unit ECU1 which is provided with CPU, ROM and RAM for calculating throttle opening, ignition timing, amount of fuel to be injected, and the like, and to which actuators (not shown) for controlling the throttle opening and the like are connected. The braking control system is adapted to perform the anti-skid control (ABS), traction control (TRC), vehicle stability control (VSC), automatic braking control (ACC) and the like, and includes a braking control unit ECU2 which is provided with CPU, ROM and RAM for the braking control to calculate various amended values as described later, and to which the wheel speed sensors WS, hydraulic pressure sensors (not shown), stop switch ST, yaw rate sensor YS, longitudinal acceleration sensor XG, lateral acceleration sensor YG and the like are connected. And, the braking control unit ECU2 is connected to the actuators (not shown).

Then, the adaptive cruise control system includes an adaptive cruise control unit ECU3, which is provided with CPU, ROM and RAM, and to which the radar sensor RS and the like are connected. The adaptive cruise control system is adapted to calculate the distance between the vehicles, relative speed to the vehicle traveling ahead, desired vehicle speed, desired deceleration and the like, and adapted to be capable of performing the automatic braking control thorough the braking control unit ECU2. Furthermore, the steering control system is connected to a steering control unit ECU4. These control units ECU1-4 are connected to the communication bus, through a communication unit (not shown) which is provided with CPU, ROM and RAM for communication, respectively. Therefore, the information required for each control system can be fed from other control systems.

Figure 3:
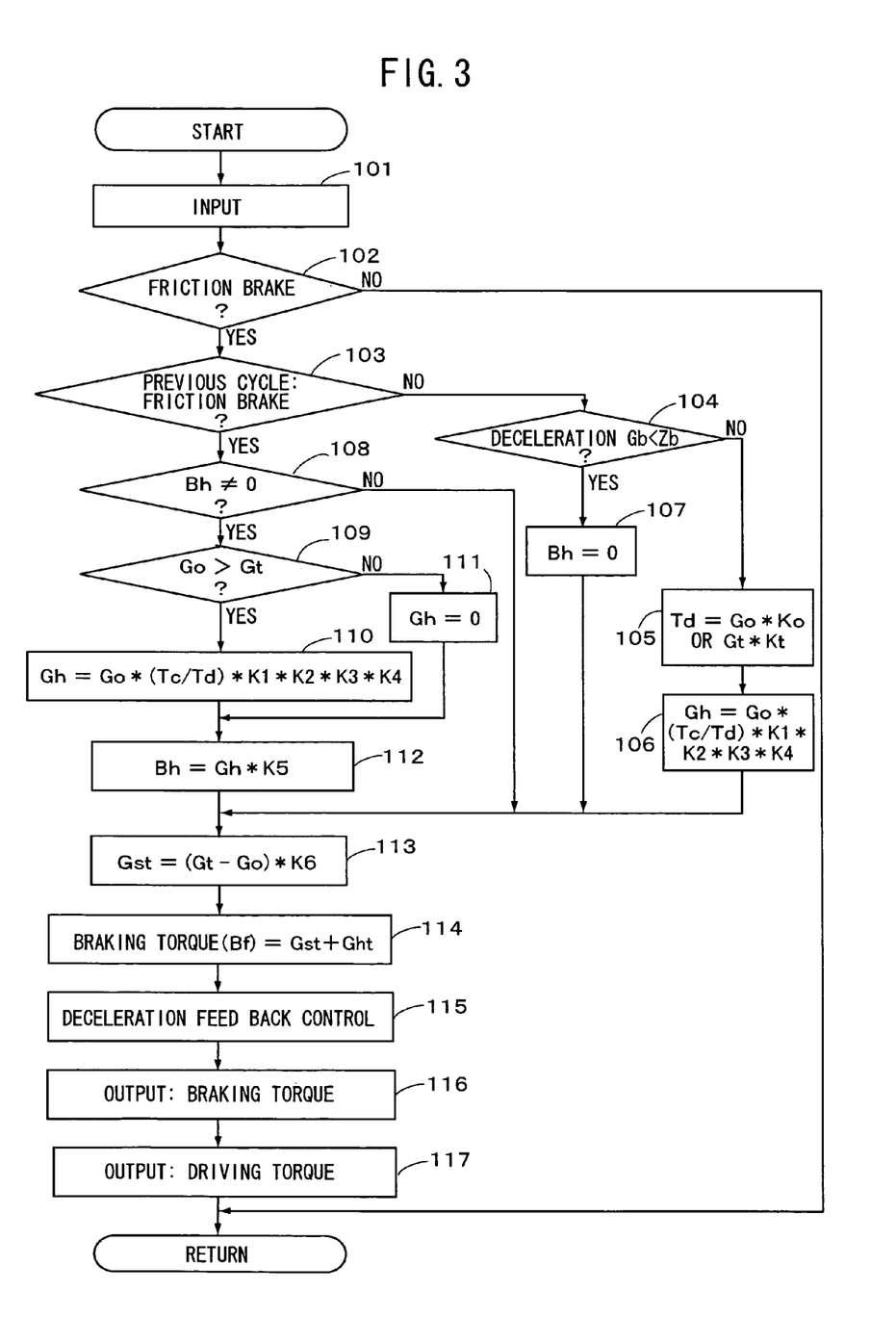
FIG. 3 is a flow chart showing an automatic braking control performed by a friction brake, according to an embodiment of the present invention.
Figure 4:
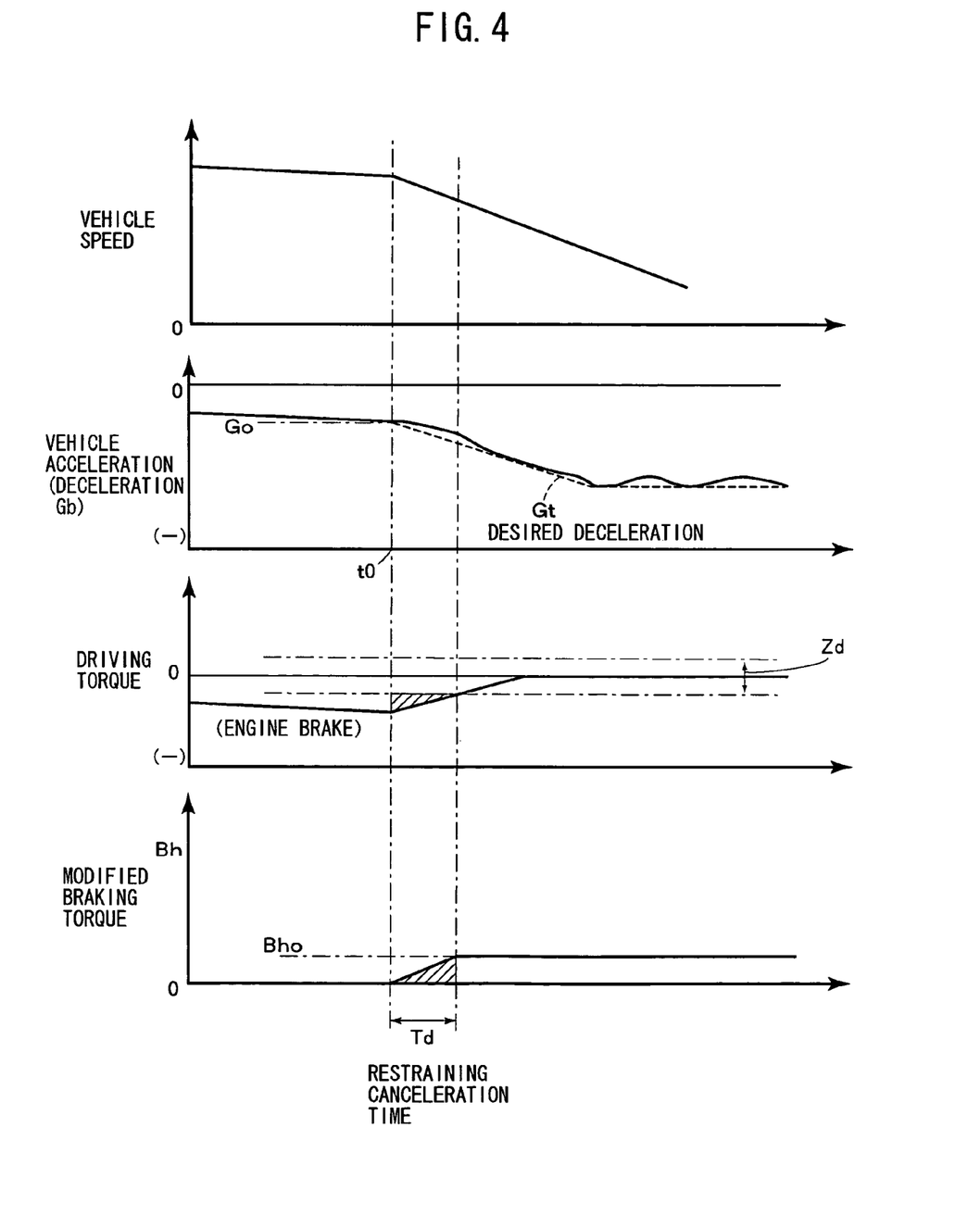
FIG. 4 is a time chart showing an automatic braking control performed by a friction brake, according to an embodiment of the present invention.

According to the vehicle as constituted above, a process for performing the automatic braking control will be explained referring to a flow chart as shown in FIG. 3 and a time chart as shown in FIG. 4. At the outset, the sensor signals are input at Step 101, and vehicle speed, longitudinal acceleration, lateral acceleration, yaw rate, distance between the vehicles or the like are read, and various data calculated by the control units ECU1-4 are read as well, through the communication signals. Next, at Step 102, it is determined whether the braking torque is being applied by the friction braking device FB. Unless the braking operation is being made, the program returns to a main routine (not shown). If the braking operation is being made, the program proceeds to Step 103, where it is determined whether the braking torque was applied by the friction braking device FB at the previous cycle. If it is determined that the braking operation was not made at the previous cycle, the program proceeds to Step 104, where it is determined whether the vehicle deceleration Gb is within a predetermined blind zone Zb. Unless the vehicle deceleration Gb is within the blind zone Zb, a time period for cancelling a torque restraining (abbreviated as restraining cancellation time) Td is calculated at Step 105, as Td=Go·Ko, or Td=Gt·Kt, wherein Ko and Kt are correction factors. Furthermore, on the basis of the restraining cancellation time Td and the deceleration Go at the time of determination, a modified deceleration Gh is calculated at Step 106.

Figure 5:
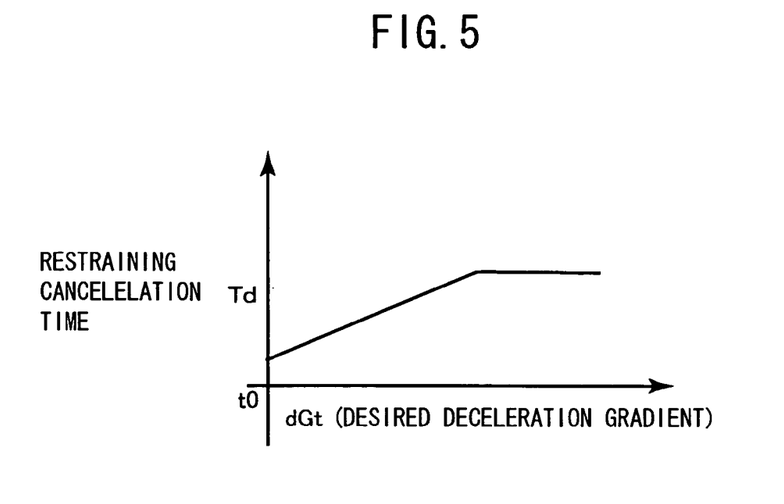
FIG. 5 is a diagram showing an example of a map for setting a time period for cancelling a torque restraining by a torque restraining cancellation device.
Figure 6:
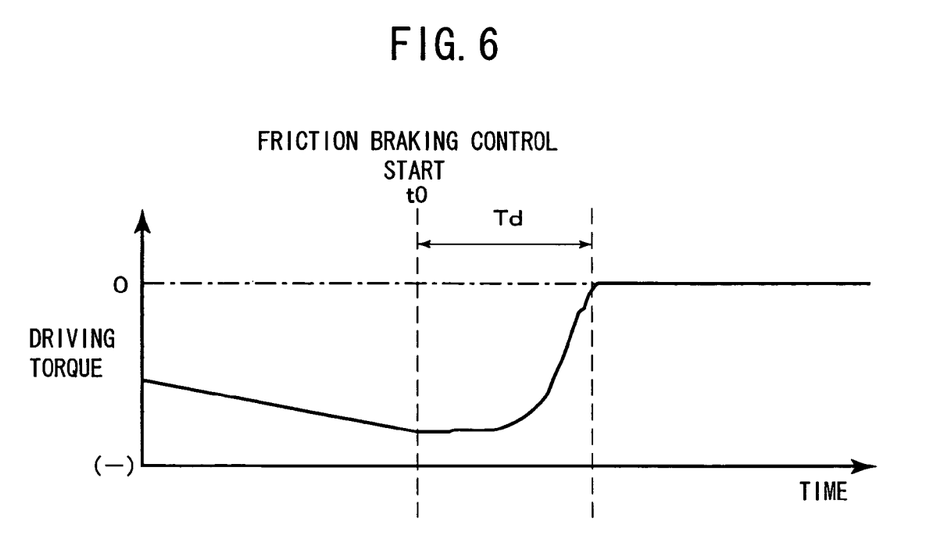
FIG. 6 is a diagram showing another example of a map for setting a time period for cancelling a torque restraining by a torque restraining cancellation device.

The restraining cancellation time Td may be set in response to variation of the desired deceleration Gt under the automatic braking control. For example, the restraining cancellation time Td may be set, according to a map provided on the basis of a gradient dGt of the desired deceleration Gt as shown in FIG. 5. The restraining cancellation time Td may be set to be relatively long, when the gradient dGt of the desired deceleration Gt from the time when the braking torque is applied by the friction braking device FB, i.e., start of friction brake (time "t0" in FIGS. 4 and 5) is relatively large. Instead, if the gradient dGt is relatively small, the restraining cancellation time Td may be set to be relatively short. In the case where the gradient dGt is relatively large, a rapid increase of the deceleration will be required. Therefore, if the restraining cancellation time Td is set to be relatively short, a response of the friction brake is delayed, so that a lack of deceleration of the vehicle will be caused. On the contrary, in the case where the gradient dGt of the desired deceleration Gt is relatively small, it will not be affected so much by the delay of the response of the friction brake, so that the restraining cancellation time Td can be set to be relatively short. The restraining cancellation time Td may be set according to variation of the restraining torque, such that it is set on a non-linear map as shown in FIG. 6, for example. In FIG. 6, "t0" indicates the time when the braking torque begins to be applied by the braking torque device FB. As a delay in response is caused at the beginning of the friction brake, insufficiency of deceleration required for the vehicle as a whole might be caused. Therefore, it may be appropriate to provide the non-linear characteristic as shown in FIG. 6 for the engine brake part, to compensate the delay in response at the beginning of the friction brake.

Referring back to FIG. 4, at Step 106, on the basis of the deceleration Go obtained when the braking torque is applied according to the restraining cancellation time Td and the friction braking device FB, i.e., at the beginning of the friction brake ("t0" in FIG. 4), a modified deceleration Gh can be calculated in accordance with the following equation: Gh=Go·(Tc/Td)·K1·K2·K3·K4. In this equation, "Tc" is a time lapsed after the friction brake began, "K1" is a vehicle traveling resistance correction factor, "K2" is a correction factor for variation of road surface inclination after the friction brake began, "K3" is a shift change correction factor, and "K4" is a vehicle speed variation correction factor. The result of (Tc/Td) means a varying rate of the lapsed time Tc to the restraining cancellation time Td. Therefore, the modified deceleration Gh at the lapsed time Tc equals to Go (Tc/Td).

The vehicle traveling resistance correction factor K1 as described above is set for each vehicle, in accordance with air resistance to the vehicle, rolling resistance of a tire, or the like. As the air resistance has a dependency on a vehicle speed, it can be obtained by estimating the vehicle speed based on the wheel speeds detected by the wheel speed sensors WS1-WS4, and multiplying the estimated vehicle speed by a specific value for each vehicle. The traveling resistance correction factor K2 is the correction factor which is set in accordance with variation of the road surface inclination after the friction brake began. In order to detect the variation of the road surface inclination, an inclination sensor (not shown) may be equipped. Instead, the variation of the road surface inclination can be determined, on the basis of comparison between the deviation of the wheel speed detected by the wheel speed sensors WS1-WS4 and the output of the longitudinal acceleration sensor XG, as described before. The shift change correction factor K3 is the correction factor which is set in accordance with the shift change of the transmission GS, and set on the basis of a shift position signal detected by a sensor (not shown) installed within the transmission GS. And, the vehicle speed variation correction factor K4 is set in accordance with variation of the estimated vehicle speed calculated on the basis of the wheel speeds detected by the wheel speed sensors WS1-WS4, for example. Thus, the correction factors K1-K4 are set on the basis of the result of determination by the vehicle traveling state determination device VD.

On the other hand, when it is determined that the vehicle deceleration Gb is within a predetermined blind zone Zb at Step 104, the program proceeds to Step 107 where the braking torque correction value Bh corresponding to the restraining torque is set to be zero, and further proceeds to Step 113 as described later. In the case where it is determined to Step 103 that the braking torque was applied by the friction braking device FB at the previous cycle, the program proceeds to Step 108, where it is determined whether the braking torque correction value Bh is zero or not. Unless the braking torque correction value Bh is zero, it is determined that the engine brake is relatively large, and the program proceeds to Step 109. If it is determined that the braking torque correction value Bh is zero, it is determined that the engine brake is relatively small, the program jumps to Step 113. At Step 109, the deceleration Go obtained at the beginning of the friction brake (t0) is compared with a desired deceleration Gt. If it is determined that the deceleration Go is larger than the desired deceleration Gt, the program proceeds to Step 110, where the modified deceleration Gh is calculated in accordance with the equation: $Gh=Go \cdot (Tc/Td) \cdot K1 \cdot K2 \cdot K3 \cdot K4$, in the same manner as calculated at Step 106.

Alternatively, at Step 109, it may be so constituted that the torque restraining operation is to be canceled, for the time period determined in response to the vehicle speed decreasing state, after the condition for initiating the automatic braking control was fulfilled, and the braking torque was applied to each wheel. Then, it may be determined that the condition for initiating the automatic braking control was fulfilled, when a gear shift for the vehicle was made. Or, it may be determined that the condition for initiating the automatic braking control was fulfilled, when an output torque of the engine exceeded a predetermined torque. Furthermore, it may be determined that the condition for initiating the automatic braking control was fulfilled, when the vehicle speed became to be smaller than a predetermined speed.

If it is determined at Step 109 that the deceleration Go is equal to or smaller than the desired deceleration Gt, the program proceeds to Step 111, where the modified deceleration Gh is set to be zero, and further proceeds to Step 112. Then, at Step 112, on the basis of the modified deceleration Gh, the braking torque correction value Bh is calculated, or converted, in accordance with the equation: $Bh=Gh \cdot K5$, wherein "K5" is a conversion factor converted from the deceleration to the braking torque. In FIG. 4, "Bho" indicated at its bottom is the value converted into torque of the deceleration Go, which is obtained when the friction brake begins. And, the program further proceeds to Step 113, where a converted torque Gst of a reference deceleration Gs is calculated on the basis of the difference between the deceleration Go and the desired deceleration Gt, in accordance with the equation: $Gst=(Gt-Go) \cdot K6$, wherein "K6" is a conversion factor converted from the deceleration to the braking torque.

Next, the program proceeds to Step 114, where a braking torque Bf applied by the friction braking device FB is calculated as the sum of the converted torque Gst of the reference deceleration Gs and a converted torque Ght of the modified deceleration Gh, i.e., $Bf=Gst+Ght$. Then, the program proceeds to Step 115, where a deceleration feedback control for the braking torque Bf is performed, and proceeds to Step 116, where the braking torque Bf is output, and further proceeds to Step 117, where the driving torque is converted into a throttle opening, for example, and output.

Figure 7:
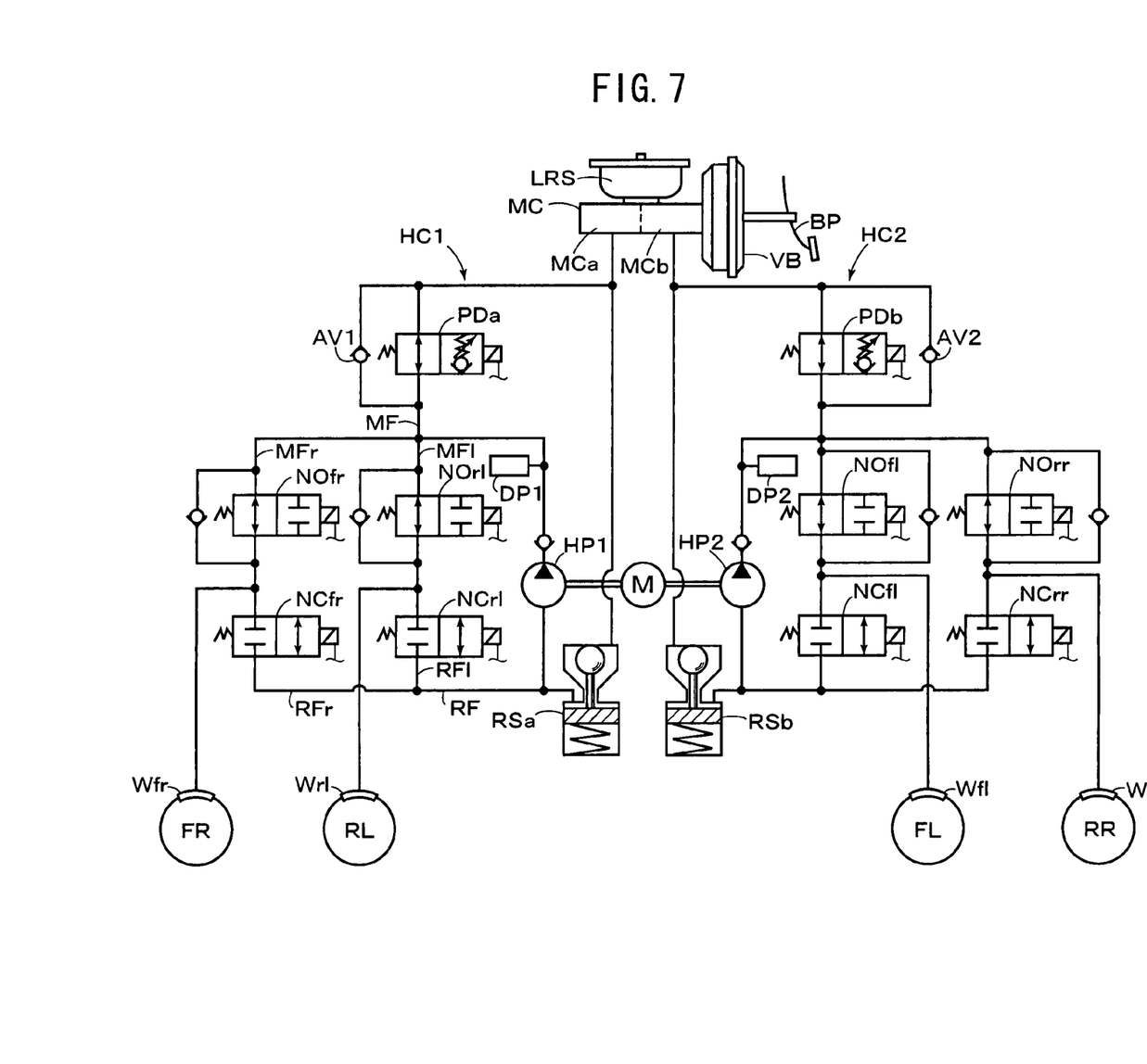
FIG. 7 is a block diagram showing a hydraulic brake system according to an embodiment of the present invention.

Next, referring to FIG. 7, will be explained the hydraulic brake system including the hydraulic brake control apparatus BC as shown in FIG. 2, to be capable of being served as the friction braking device FB and automatic braking control device AB as shown in FIG. 1. According to this embodiment, a master cylinder MC is activated through a vacuum booster VB in response to depression of the brake pedal BP to pressurize the brake fluid in a low-pressure reservoir LRS and discharge the master cylinder pressure to the hydraulic circuits for the wheels FR and RL, and the wheels FL and RR, respectively. The master cylinder MC is of a tandem type having two pressure chambers communicated with the first and second hydraulic circuits HC1 and HC2, respectively. That is, a first pressure chamber MCa of the master cylinder MC is communicated with a first hydraulic circuit HC1 for the wheels FR and RL, and a second pressure chamber MCb is communicated with a second hydraulic circuit HC2 for the wheels FL and RR. Thus, according to this embodiment, the hydraulic circuit system is divided into two hydraulic circuits (HC1 and HC2) to form a diagonal circuit (so called X-circuit) system, while a front-rear dual circuit system may be formed.

In the first hydraulic circuit HC1, the first pressure chamber MCa is communicated with wheel brake cylinders Wfr and Wrl, respectively, through a main hydraulic passage MF and its branch hydraulic passages MFr and MFl. In the main passage MF, there is disposed a proportional pressure difference valve PDa. This proportional pressure difference valve PDa is controlled by the electronic control unit ECU (braking control unit ECU2) to change its position between a communicating position and a pressure difference position, at the latter position of which a passage is narrowed in accordance with the pressure difference between the pressure at the side of the master cylinder MC and the pressure at the side of normally open valves NOfr and NOrl, to provide a desired pressure difference. In parallel with the proportional pressure difference valve PDa, there is disposed a check valve AV1 which allows the brake fluid in the master cylinder MC to flow to a downstream direction (toward the wheel brake cylinders Wfr and Wrl), and prevents its reverse flow. The check valve AV1 is provided for pressurizing the hydraulic pressure in the wheel brake cylinders Wfr and Wrl, when the brake pedal BP is depressed, even if the proportional pressure difference valve PDa is placed in its closed position.

The normally open valves NOfr and NOrl are disposed in the branch passages MFr and MFl, respectively. And, normally closed valves NCfr and NCrl are disposed in branch passages RFr and RFl communicated with the wheel brake cylinders Wfr and Wrl, respectively, which merge into a drain passage RF connected to a reservoir RSa. In the first hydraulic circuit HC1 for the wheels FR and RL, a hydraulic pressure pump HP1 is disposed, with its outlet connected to the normally open valves NOfr and NOrl through a damper DP1, and with its inlet connected to the reservoir RSa. In the second hydraulic circuit HC2 for the wheels FL and RR, there are disposed a proportional pressure difference valve PDb, damper DP2, normally open valves NOfl and NOrr, normally closed valves NCfl and NCrr, and a check valve AV2. The hydraulic pressure pump HP2 is driven by an electric motor M together with the hydraulic pressure pump HP1, both of the pumps HP1 and HP2 will be driven continuously after the motor M begins to operate them.

Accordingly, the proportional pressure difference valve PDa (and PDb) is controlled by the electronic control unit ECU to change its position between a communicating position and a pressure difference position, at the latter position of which a passage is narrowed in accordance with the pressure difference between the pressure at the side of the master cylinder MC and the pressure at the side of normally open valves NOfr and NOrl, to provide a desired pressure difference. In this connection, the normally open valves NOfr and NOrl and the like act as a so-called cut-off valve. Therefore, the braking toque can be applied to the wheels FR and the like in response to operation of the brake pedal BP by the vehicle driver, and also the braking toque can be automatically applied to the wheels FR and the like independent of the brake pedal BP.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. An automatic braking apparatus for a vehicle, comprising:
    torque applying means for applying a driving torque to at least a pair of wheels of said vehicle;
    torque restraining means performing a driving torque restraining operation for restraining the driving torque created on said wheels to which the driving torque is applied by said torque applying means;
    friction braking means for applying a braking torque to each wheel of said vehicle in response to operation of a manually operated braking member by a vehicle driver;
    deceleration detection means for detecting a deceleration of said vehicle;
    automatic braking control means for performing an automatic braking control, by automatically actuating said friction braking means independently of operation of said manually operated braking member, to apply the braking torque to each wheel;
    desired deceleration calculation means for calculating a desired deceleration for a control target to the deceleration detected by said deceleration detection means; and
    torque restraining cancellation means for cancelling the driving torque restraining operation performed by said torque restraining means;
    wherein the cancellation of the driving torque restraining operation is performed during application of the braking torque to said each wheel after the braking torque has begun to be applied by said automatic braking control means and is continued for a time period determined in response to a vehicle speed decreasing state of said vehicle; and
    wherein the larger the gradient of the desired deceleration becomes, the longer said time period becomes.

2. An automatic braking apparatus as set forth in claim 1, further comprising deceleration detection means for detecting a deceleration of said vehicle, wherein said torque restraining cancellation means cancels the torque restraining operation performed by said torque restraining means, when the deceleration detected by said deceleration detection means exceeds a predetermined reference deceleration.

3. An automatic braking apparatus as set forth in claim 1, further comprising vehicle traveling state determination means for determining a vehicle traveling state including an inclination of road surface on which said vehicle is traveling, wherein said torque restraining cancellation means cancels the torque restraining operation performed by said torque restraining means, in response to a variation of the inclination of road surface determined by said vehicle traveling state determination means.

4. An automatic braking apparatus as set forth in claim 1, wherein said time period is set in response to a variation of the torque restrained by said torque restraining means.

5. An automatic braking apparatus as set forth in claim 1, further comprising radar means for detecting a state in front of said vehicle, wherein said automatic braking control means applies the braking torque to each wheel, in response to the state detected by said radar means.

6. An automatic braking apparatus as set forth in claim 1, wherein said torque applying means includes an engine for constituting a power train installed in said vehicle, and wherein said torque restraining means restrains the torque created on said wheels to be applied with the torque by said torque applying means, with an engine brake provided by said engine.

7. An automatic braking apparatus as set forth in claim 1, wherein said torque restraining cancellation means cancels the torque restraining operation performed by said torque restraining means, for the time period determined in response to the vehicle speed decreasing state of said vehicle, after the condition for initiating the automatic braking control performed by said automatic braking control means was fulfilled, and the braking torque was applied to each wheel.

8. An automatic braking apparatus as set forth in claim 1, wherein said torque restraining cancellation means determines that the condition for initiating the automatic braking control was fulfilled, when a gear shift for said vehicle was made.

9. An automatic braking apparatus as set forth in claim 1, wherein said torque restraining cancellation means determines that the condition for initiating the automatic braking control was fulfilled, when an output torque of said engine exceeded a predetermined torque.

10. An automatic braking apparatus as set forth in claim 1, wherein said torque restraining cancellation means determines that the condition for initiating the automatic braking control was fulfilled, when a vehicle speed of said vehicle became to be smaller than a predetermined speed.

11. An automatic braking apparatus for a vehicle, comprising:
    torque applying means for applying a driving torque to at least a pair of wheels of said vehicle;
    torque restraining means performing a driving torque restraining operation for restraining the driving torque created on said wheels to which the driving torque is applied by said torque applying means;

friction braking means for applying a braking torque to each wheel of said vehicle in response to operation of a manually operated braking member by a vehicle driver;

automatic braking control means for performing an automatic braking control, by automatically actuating said friction braking means independently of operation of said manually operated braking member, to apply the braking torque to each wheel;

desired deceleration calculation means for calculating a desired deceleration of said vehicle;

torque restraining cancellation means for cancelling the driving torque restraining operation performed by said torque restraining means;

wherein the cancellation of the driving torque restraining operation is performed during application of the braking torque to said each wheel after the braking torque has begun to be applied by said automatic braking control means and is continued for a time period determined in response to a vehicle speed decreasing state of said vehicle; and wherein the larger the gradient of the desired deceleration becomes, the longer said time period becomes.

\* \* \* \* \*